United States Patent

[11] 3,627,089

| [72] | Inventor | Donald S. Dence |
| | | Brooklyn, Mich. |
| [21] | Appl. No. | 54,262 |
| [22] | Filed | July 13, 1970 |
| [45] | Patented | Dec. 14, 1971 |
| [73] | Assignee | Clark Equipment Company |

[54] CENTRIFUGAL CLUTCH
13 Claims, 5 Drawing Figs.

[52] U.S. Cl. .................................................. 192/105 CP,
192/105 C
[51] Int. Cl. ................................................ F16d 43/24
[50] Field of Search ........................................... 192/105
CP, 105 C, 103 R

[56] References Cited
UNITED STATES PATENTS
1,797,820  3/1931  Brump ........................ 192/105 CP

*Primary Examiner*—Mark M. Newman
*Assistant Examiner*—Randall Heald
*Attorneys*—Kenneth C. Witt, John C. Wiessler, Robert H. Johnson and Reginald J. Falkowski ABSTRACT: A centrifugal clutch wherein swing levers adapted to pivot under a predetermined centrifugal force cause a pressure ring to index and thus compress a clutch pack for engagement of the clutch. The swing levers are operatively connected to the pressure ring by a plurality of springs that also serve to bias the swing levers and the pressure ring to a clutch disengaged position.

Patented Dec. 14, 1971  3,627,089

INVENTOR
DONALD S. DENCE
BY Robert H. Johnson
ATTORNEY

CENTRIFUGAL CLUTCH

BACKGROUND OF THE INVENTION

This invention relates to centrifugal clutches adapted to engage automatically for the transmission of power to an output shaft from an input shaft when the input shaft has reached a selected rotative speed. One common type of centrifugal clutch comprises shoes that are forced outwardly by centrifugal force into engagement with an enclosing drum. A second type of centrifugal clutch comprises levers adapted to pivot outwardly under centrifugal force and are connected by mechanical links to transmit the centrifugal force to a ring and move it into clutching engagement with a clutch pack having interleaved friction discs alternately connected to the output shaft and the input shaft. Since centrifugal force increases gradually with speed, clutches activated by centrifugal force usually are subjected to rubbing wear during engagement and do not provide a positive preselected instant of engagement. Clutches activated by centrifugal force must disengage near the same speed at which they engage and, therefore, transmissions comprising such clutches may randomly engage and disengage when operated near the selected speed.

A principal object of my invention is to provide an improved centrifugal clutch. The clutch I provide is adapted to engage and disengage quickly and is also adapted to disengage at a preselected speed less than that selected for engagement.

SUMMARY OF THE INVENTION

In carrying out my invention in one preferred embodiment thereof, I provide a centrifugal clutch having a hub connected to an input shaft for conjoint rotation therewith and a pressure ring spaced apart from a backup flange on the hub. The pressure ring is adapted to move toward the flange into clutching engagement with an intermediate clutch pack having interleaved friction discs that are alternately connected to the input shaft and an output shaft for respective conjoint rotation therewith. Swing levers are pivotally connected to the hub and adapted to swing outwardly in response to a predetermined centrifugal force, thereupon actuating resilient components that urges the pressure ring to index slightly. Indexing of the pressure ring causes cams to operate for the movement of the pressure ring toward the flange to compress the clutch pack and engage the clutch.

The above and other objects, features, and advantages of my invention will be more readily understood by persons skilled in the art when the following detailed description is taken in conjunction with the drawing.

DESCRIPTION OF PREFERRED EMBODIMENT

Figure 1:
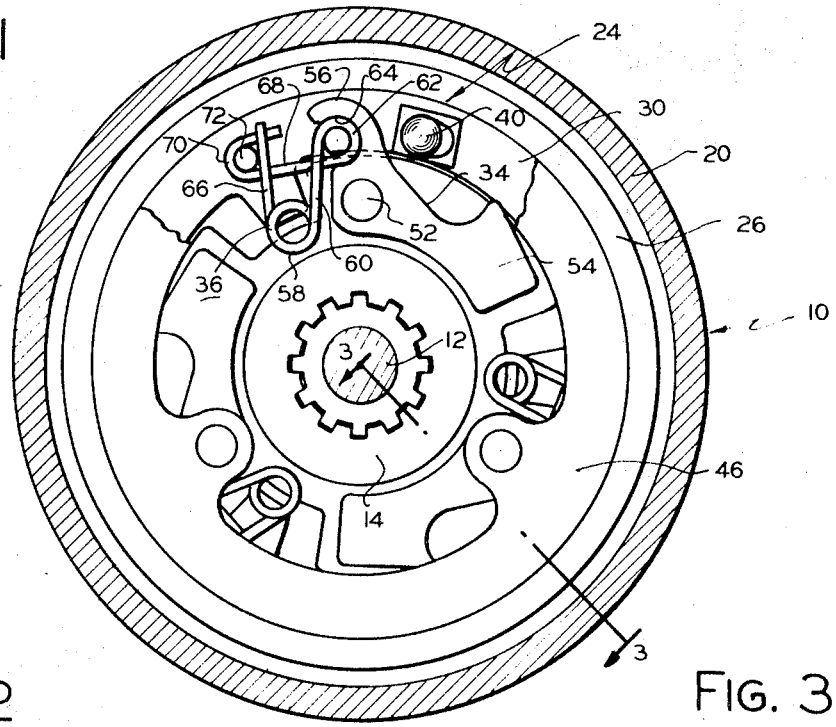
FIG. 1 is an elevational view of a centrifugal clutch according to this invention, with portions removed to show an actuating mechanism in the unactuated position.
Figure 3:
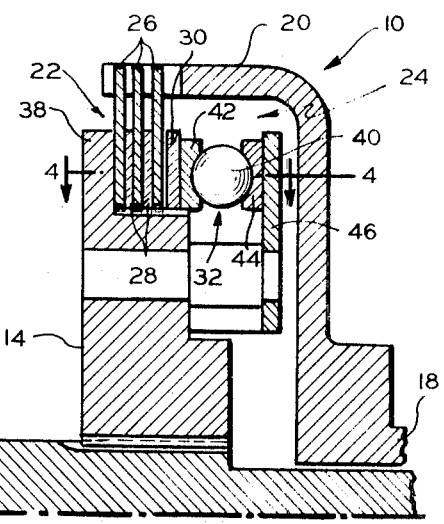
FIG. 3 is an enlarged sectional view along line 3—3 of FIG. 1.

Referring to FIGS. 1 and 3, a centrifugal clutch according to this invention is indicated generally by the reference numeral 10. An input shaft 12 having a spline connected hub 14 is journaled for rotation about centerline 16 and is coupled to receive power from an engine or other power source (not shown). An output shaft 18 having a drum 20 connected thereto also is journaled for rotation about centerline 16 and is coupled to any mechanism to which it is desired to deliver power. Clutch 10 comprises a clutch pack 22 of the type commonly used in the clutch art and an actuating mechanism indicated generally by the number 24 that provides means for compressing clutch pack 22 when input shaft 12 has exceeded a selected speed. Clutch pack 22 includes a plurality of annular friction discs 26 splined to drum 20 for rotation therewith that are interleaved with a plurality of annular friction discs 28 splined to hub 14 for rotation therewith so that when clutch pack 22 is compressed, output shaft 18 is connected for conjoint rotation with input shaft 12 and clutch 10 is engaged. Actuating mechanism 24 is responsive to the rotative speed of clutch 10 to selectively compress the clutch pack and comprises a pressure ring 30, thrust mechanisms 32, one or more swing levers 34, and resilient components 36 associated with each swing lever.

Figure 4:
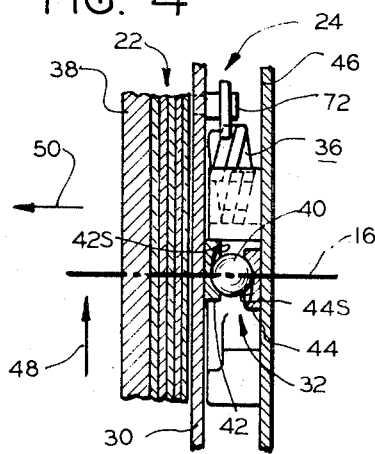
FIG. 4 is a fragmentary view along line 4—4 of FIG. 3.

Pressure ring 30 is annular and is provided with 2 degrees of freedom, being rotatable through a selected index angle about centerline 16 between a disengaged position and an engaged position and also movable axially toward a backup flange 38 that extends outwardly from hub 14. Clutch pack 22 is disposed intermediate pressure ring 30 and backup flange 38 so that when pressure ring 30 moves axially toward backup flange 38 the clutch pack is compressed to engage the clutch. In this embodiment the movement of pressure ring 30 toward backup flange 38 is accomplished by thrust mechanism 32 comprising a ball 40 located between a first cam 42 connected to pressure ring 30 and a second cam 44 connected to a retaining ring 46. Retaining ring 46 is connected for rotation with hub 14 and is immovable relative thereto to provide a base for the reactive force of thrust mechanism 32. Referring to FIG. 4, thrust mechanism 32 is viewed in a radial direction to more clearly show the relationship between ball 40 and the oppositely inclined tangental camming surfaces 42S and 44S. In the operation of thrust mechanism 32, when pressure ring 30 indexes counterclockwise about centerline 16 relative to retaining ring 46 in the direction indicated by the arrow numbered 48 ball 40 is urged to roll "up" inclined surface 42S and inclined surface 44S to move pressure ring 30 toward backup flange 38 in the direction indicated by the arrow numbered 50.

Figure 2:
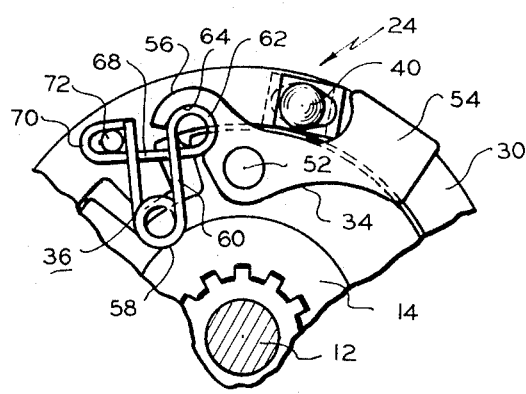
FIG. 2 is a fragmentary view of the clutch shown in FIG. 1 with portions removed to show the actuating mechanism in the actuated position.
Figure 5:
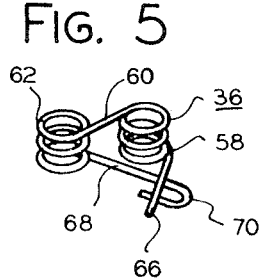
FIG. 5 is a perspective view of one of the resilient components used in the actuating mechanism.

Referring specifically to FIG. 1, clutch 10 is shown in elevation with a portion of retaining ring 46 and drum 20 removed to show one of the swing levers 34 and its associated resilient component 36 (FIGS. 1 and 5) that provide means for selectively indexing pressure ring 30 counterclockwise to operate the thrust mechanism and engage the clutch. Swing lever 34 is pivotally connected to hub 14 upon the pin 52 so that the swing lever is urged to pivot outwardly under centrifugal force. A helical coil spring 58 forming a portion of resilient component 36 is connected to the swing lever arm 56 and is of a torsional strength selected to overcome the centrifugal forces acting upon the swing lever arm 54 until the speed selected for clutch engagement is reached. Projecting from one end of spring 58 is a spring extension 60 having a second helical coil spring 62 formed in the extremity thereof that is adapted to be received by an arcuate recess 64 in arm 56 to provide for the transmission of forces between spring 58 and arm 56. The reactive forces of spring 58 are exerted upon pressure ring 30 through a second spring extension 66 from spring 58 that abuts a post 72 extending axially from pressure ring 30 (FIGS. 1 and 4). The force of extension 66 urging pressure ring 30 to index counterclockwise about centerline 16 is negated by a tensile member connected to transmit tensile forces only between extension 60 and pressure ring 30, such as a third spring extension 68 projecting from the end of spring 62 having a curved portion 70 that is looped partially around post 72. Referring to FIG. 2, actuating mechanism 24 is shown in the position it assumes after clutch 10 has engaged. In operation, as the speed of hub 14 increases to that selected for clutch engagement the centrifugal forces acting outwardly upon arm 54 increase until their moment acting counterclockwise about pivot 52 exceeds the opposing clockwise moment created by the force of extension 60 acting through arm 56; whereupon swing lever 34 pivots counterclockwise from the inward position shown in FIG. 1 to the outward position shown in FIG. 2. When swing lever 34 pivots to the outward position, the tension in extension 68 is no longer exerted upon post 72 since portion 70 translates away from the post as shown in FIG. 2, and the reactive force of spring 58 upon pressure ring 30 is no longer negated. Pressure ring 30 is thereupon urged to index counterclockwise by the reactive force exerted through extension 66 so that thrust mechanism 32 operates to move pressure ring 30 toward backup flange 38, compressing the clutch pack and engaging the clutch. During accelerating operation of clutch 10, when swing lever 34 begins to pivot from the inward position toward the outward position the clockwise moment of extension 60 about pivot 52 decreases sharply due to its decreasingly effective lever arm while at the same time the counterclockwise moment of arm 54 continues to increase due to increasing centrifugal force. The resulting overbalance in favor of counterclockwise moments urges swing lever 34 to pivot quickly to the outward position, thereby quickly engaging clutch 10 at the speed selected for clutch engagement. Likewise, during decelerating operation of clutch 10, when swing lever 34 begins to pivot from the outward position toward the inward position the clockwise moment of extension 60 increases sharply due to its increasingly effective lever arm, while at the same time the counterclockwise moment of arm 54 continues to decrease due to decreasing centrifugal force. The resulting overbalance during deceleration in favor of clockwise moments urges swing lever 34 to pivot quickly to its inward position, thereby quickly disengaging clutch 10. When swing lever 34 is in the outward position the clockwise moment about pivot 52 that is created by the torsional force of spring 58 acting through extension 60 is less than that created when swing lever 34 is in the inward position because the effective lever arm through which the spring force acts is reduced. Therefore, the clockwise spring force moment of extension 60 is more easily overcome in the outward position by the counterclockwise centrifugal force moment of arm 54 so that during decelerating operation of clutch 10 swing lever 34 will not return to the inward position until the speed of clutch 10 has decreased to a magnitude less than that selected for engagement. The reduced clockwise moment exerted by extension 60 upon swing lever 34 in the outward position relative to the inward position provides for positive engagement and disengagement of clutch 10 since the clutch will not disengage until it decelerates to a speed below which it may engage, nor will the clutch engage until it accelerates to a speed above which it may disengage.

While I have described and illustrated herein one preferred embodiment of my invention, it will be appreciated that modifications may be made therein. Therefore, it should be understood that I intend to cover all such modifications which fall within the spirit and scope of my invention.

I claim:

1. An actuating mechanism for use with a centrifugal clutch comprising a swing lever pivotally connected to the clutch to pivot from an inward position to an outward position in response to centrifugal force, a pressure ring indexable between a disengaged position and an engaged position, and a resilient component connected to said swing lever and said pressure ring for urging said pressure ring toward said engaged position when said swing lever pivots toward said outward position and for urging said swing lever toward said inward position.

2. An actuating mechanism according to claim 1 and including means for retaining said pressure ring at said disengaged position when said swing lever is at said inward position.

3. An actuating mechanism according to claim 2 wherein said retaining means is a tensile member connected to said swing lever and to said pressure ring to transmit tensile forces only between said swing lever and said pressure ring in a direction to urge said pressure ring toward said disengaged position when said swing lever is at said inward position.

4. An actuating mechanism according to wherein said resilient component is a coil spring having first and second spring extensions projecting from opposite ends thereof, said first spring extension connected for the transmission of forces with said swing lever in a direction to urge said swing lever toward said inward position and said second spring extension connected for the transmission of forces with said pressure ring in a direction to urge said pressure ring toward said engaged position.

5. An actuating mechanism according to claim 4 and including means for retaining said pressure ring at said disengaged position when said swing lever is at said inward position.

6. An actuating mechanism according to claim 5 wherein said retaining means is a tensile member connected to said swing lever and to said pressure ring to transmit tensile forces only between said swing lever and said pressure ring in a direction to urge said pressure ring toward said disengaged position when said swing lever is at said inward position.

7. An actuating mechanism according to claim 4 wherein said resilient component includes a second coil spring formed in said first spring extension, said second spring having a third spring extension projecting therefrom that is connected to said pressure ring for the transmission of tensile forces only in a direction to urge said pressure ring toward said disengaged position when said swing lever is at said inward position.

8. A centrifugal clutch for use in the transmission of power from a rotatable input shaft to a rotatable output shaft comprising:
    a hub connected for rotation with the input shaft and having a backup flange thereon,
    a clutch pack adjacent said backup flange for connecting the output shaft to the input shaft for conjoint rotation when said clutch pack is compressed,
    a pressure ring spaced axially apart from said backup flange, said pressure ring being rotatable through a selected index angle about the centerline of the clutch between a first position and a second position and also movable axially between a third position that is axially apart from said clutch pack and a fourth position in which said clutch pack is compressed,
    a thrust mechanism for urging said pressure ring toward said fourth position when said pressure ring is rotated from said first position toward said second position,
    a swing lever pivotally connected to said hub to pivot from an inward position to an outward position in response to centrifugal force, and,
    a resilient component connected to said swing lever and said pressure ring for urging said pressure ring toward said second position when said swing lever pivots toward said outward position and for urging said swing lever toward said inward position.

9. A centrifugal clutch according to claim 8 wherein said resilient component is a coil spring having first and second spring extensions projecting from opposite ends thereof, said first extension connected for the transmission of forces with said swing lever in a direction to urge said swing lever toward said inward position and said second extension connected for the transmission of forces with said pressure ring in a direction to urge said pressure ring toward said second position.

10. A centrifugal clutch according to claim 8 and including a tensile member connected to said swing lever and said pressure ring for urging said pressure ring toward said first position when said swing lever is at said inward position.

11. A centrifugal clutch according to claim 9 wherein said resilient component includes a second coil spring formed in said first extension having a third spring extension therefrom, said third extension connected to said pressure ring for the transmission of tensile forces only in a direction to urge said pressure ring toward said first position when said swing lever is at said inward position.

12. An actuating mechanism according to claim 7 wherein the axis of said first coil spring and the axis of said second coil spring are substantially parallel and wherein said first, second and third spring extensions lie within planes substantially perpendicular to said first and second spring axes.

13. An actuating mechanism according to claim 12 wherein the projections in a common plane of said first spring extension and said second spring extension extend at an acute angle, and wherein the projection of said third spring extension in said common plane crosses the extended projections of said first and second spring extensions.

* * * * *

UNITED STATES PATENT OFFICE
CERTIFICATE OF CORRECTION

Patent No. 3,627,089            Dated December 14, 1971

Inventor(s)  Donald S. Dence

It is certified that error appears in the above-identified patent and that said Letters Patent are hereby corrected as shown below:

Column 3, line 74, after "to" insert -- claim 2 --

Column 4, line 62, after "pressure" insert -- ring --

Signed and sealed this 23rd day of May 1972.

(SEAL)
Attest:

EDWARD M.FLETCHER,JR.
Attesting Officer

ROBERT GOTTSCHALK
Commissioner of Patents